Figure 1:
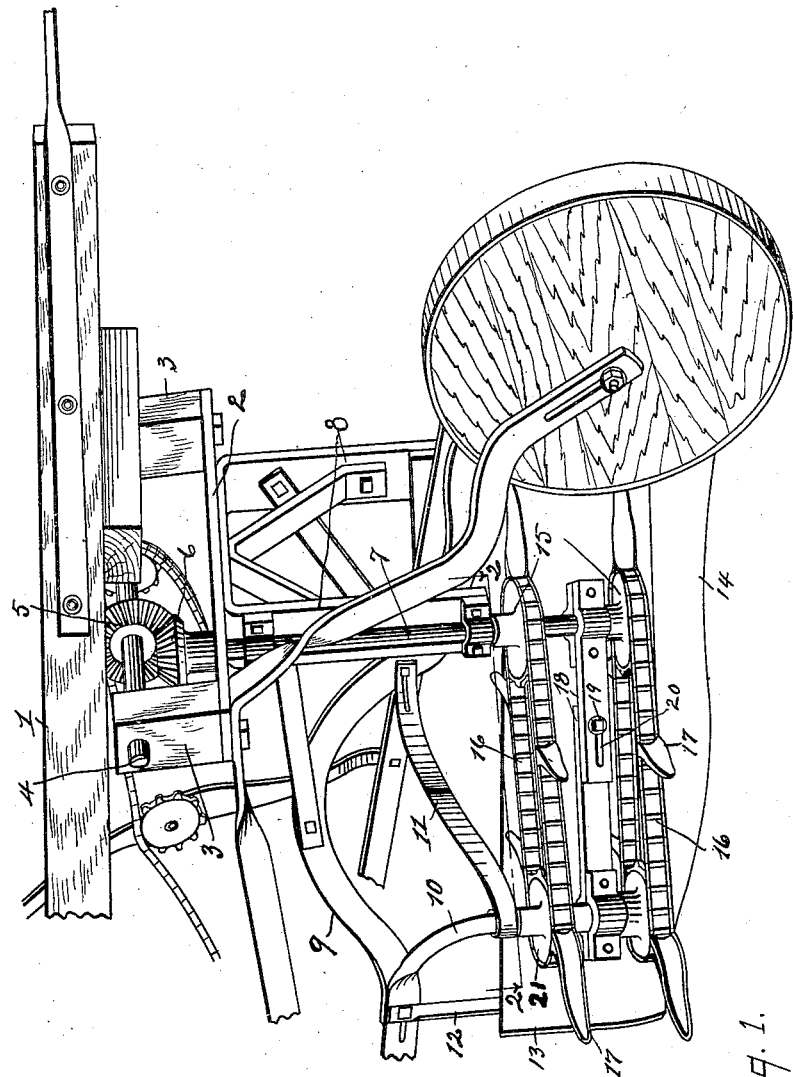

No. 877,975. PATENTED FEB. 4, 1908.
C. L. WINTERBURN.
BEET TOPPER.
APPLICATION FILED MAR. 7, 1907.

2 SHEETS—SHEET 1.

Witnesses:

Inventor,

No. 877,975.
PATENTED FEB. 4, 1908.
C. L. WINTERBURN.
BEET TOPPER.
APPLICATION FILED MAR. 7, 1907.
2 SHEETS—SHEET 2.
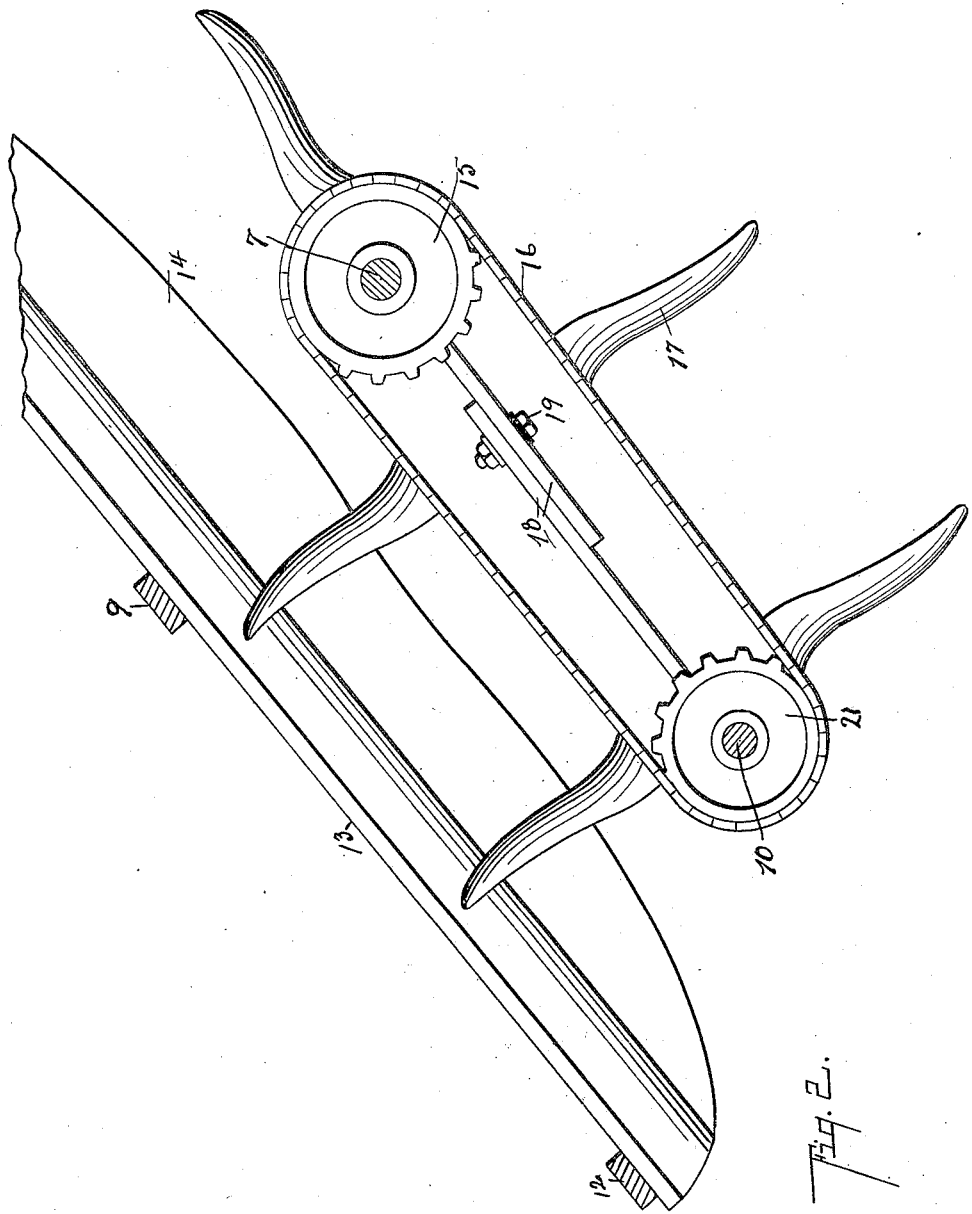

UNITED STATES PATENT OFFICE.

CLARENCE L. WINTERBURN, OF KALAMAZOO, MICHIGAN.

BEET-TOPPER.

No. 877,975.  Specification of Letters Patent.  Patented Feb. 4, 1908.

Application filed March 7, 1907. Serial No. 361,116.

*To all whom it may concern:*

Be it known that I, CLARENCE L. WINTERBURN, a citizen of the United States, residing at the city and county of Kalamazoo, State of Michigan, have invented certain new and useful Improvements in Beet - Toppers, of which the following is a specification.

This invention relates to improvements in root harvesting machines.

This invention relates particularly to improvements in the topping mechanism for beet topping machines and is especially designed for use in the structure illustrated and described in Letters Patent No. 816,633, issued to me on April 3, 1906, although it is adapted and desirable for use on other structures.

The main object of this invention is to provide an improved topping mechanism for beet harvesting machines in which the tops are effectively removed and delivered so that they do not interfere with the pulling mechanism and are not mixed with the roots after the roots are pulled.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a detail perspective of a structure embodying the features of my invention. Fig. 2 is an enlarged horizontal section taken on a line corresponding to line 2—2 of Fig. 1, looking in the direction of the little arrows at the ends of the section lines.

In the drawing, similar reference characters refer to similar parts throughout both views.

Referring to the drawing, 1 represents the main frame of the machine. At the forward end of this frame is a cross bar 2 carried by suitable hangers 3 at each end thereof. The hangers 3 serve as bearings for the horizontally-arranged shaft 4 on which is a beveled gear 5 arranged to mesh with the beveled gear 6 on the upper end of the upright or vertically-arranged shaft 7. The shaft 7 is supported in suitable bearings carried by the yoke 8 depending from the cross bar or piece 2.

I provide a share-like knife 14 which is arranged at an angle to the line of draft of the machine and is adapted to sever the tops from the roots as the machine advances along the row. At the rear edge of the knife 14 and preferably secured thereto is a mold board-like deflector plate 13. The knife and deflector plate are carried by the arms 9 and 12 depending from the frame.

On the shaft 7 I arrange a pair of sprocket wheels 15 for the sprocket chains 16. These sprocket wheels are secured to and driven by the shaft. A pair of corresponding idler sprockets 21 are mounted on the shaft 10. The shafts 7 and 10 are arranged so that they are substantially at equal distances from the deflector plate. I provide the chains 16 with fingers 17 which are adapted to engage the tops as they are severed, and carry the same rearwardly and to one side out of the way of the puller. As the pulling mechanism forms no part of this invention, I do not here illustrate the same.

The deflector 13 holds the tops upon the fingers so that they are effectively carried thereby. The fingers further serve to assist in severing the tops from the roots as they engage the same at about the same time at which the knives engage them. The shafts 7 and 10 are preferably connected by the adjustable bars 18, so that the proper tension of the chain may be maintained. I preferably accomplish this adjustment by means of the bolt 19 arranged through the slot 20 in one of the bars. By this arrangement of the parts, the tops are effectively removed and are delivered at one side entirely out of the way of the puller.

I have illustrated two chains, but find that the upper chain may be omitted and satisfactory results still be secured.

I have illustrated and described my improved topping mechanism in detail in the form preferred by me on account of its structural simplicity. I am, however, aware that it is capable of considerable variation in structural details without departing from my invention.

Having thus described my invention, what I claim as new and desire to secure by Letters Patent, is:

1. In a structure of the class described, the combination with the main frame, of a knife arranged horizontally and at an angle to the line of draft; a deflector plate secured to the rear edge of said knife; a driven sprocket; an idler sprocket; and a chain carried thereby having outwardly-projecting fingers adapted to coact with said knife and deflector plate, as described.

2. In a structure of the class described, the combination with the main frame, of a knife arranged horizontally and at an angle to the line of draft; a deflector plate arranged at the rear of said knife; a driven sprocket; an idler sprocket; and a chain carried thereby having outwardly-projecting fingers adapted to coact with said knife and deflector plate, as described.

3. In a structure of the class described, the combination with the main frame, of a knife; a deflector plate secured to the rear edge of said knife; a driven sprocket; an idler sprocket; and a chain carried thereby having outwardly-projecting fingers adapted to coact with said knife and deflector plate, as described.

4. In a structure of the class described, the combination with the main frame, of a knife; a deflector plate arranged at the rear of said knife; a driven sprocket; an idler sprocket; and a chain carried thereby having outwardly-projecting fingers adapted to coact with said knife and deflector plate, as described.

In witness whereof I have hereunto set my hand and seal in the presence of two witnesses.

CLARENCE L. WINTERBURN. [L. S.]

Witnesses:
   A. F. ADAMS,
   OTIS A. EARL.